(12) United States Patent
Curticapean et al.

(10) Patent No.: US 7,944,395 B1
(45) Date of Patent: May 17, 2011

(54) WEIGHTED DILUTION OF PRECISION CALCULATION FOR GPS FIX QUALIFICATION

(75) Inventors: Florean Curticapean, Tampere (FI); Abdelmonaem Lakhzouri, Tampere (FI); Tapio Antero Antikainen, Ruutana (FI)

(73) Assignee: Atheros Communications, Inc., San Jose, CA (US)

( * ) Notice: Subject to any disclaimer, the term of this patent is extended or adjusted under 35 U.S.C. 154(b) by 243 days.

(21) Appl. No.: 12/206,454

(22) Filed: Sep. 8, 2008

Related U.S. Application Data

(60) Provisional application No. 60/970,307, filed on Sep. 6, 2007.

(51) Int. Cl.
*G01S 19/26* (2010.01)
(52) U.S. Cl. ................................. 342/357.65
(58) Field of Classification Search ............. 342/357.15, 342/357.65
See application file for complete search history.

(56) References Cited

U.S. PATENT DOCUMENTS

| | | | | |
|---|---|---|---|---|
| 5,323,163 A | * | 6/1994 | Maki | 342/357.48 |
| 2006/0114151 A1 | * | 6/2006 | Iwami | 342/357.06 |

* cited by examiner

*Primary Examiner* — Thomas H Tarcza
*Assistant Examiner* — Harry Liu
(74) *Attorney, Agent, or Firm* — Bay Area Technology Law Group PC

(57) ABSTRACT

A method and apparatus for qualifying a Satellite Positioning System (SPS) location determination. A method in accordance with the present invention comprises determining a constellation of satellites used in the location determination, making a measurement set based on signals received from the constellation of satellites, comparing the measurement set and the constellation of satellites used in the location determination to a predetermined threshold, and reporting the location determination only when the threshold is not exceeded.

Such a method further optionally includes the threshold being user-selectable, the threshold being adjusted or disabled based on a pre-defined scheme, the threshold being adjusted in a sequential form based on a pre-defined scheme, and the measurement set being made in a Global Positioning System (GPS) receiver.

18 Claims, 4 Drawing Sheets

US 7,944,395 B1

WEIGHTED DILUTION OF PRECISION CALCULATION FOR GPS FIX QUALIFICATION

CROSS-REFERENCE TO RELATED APPLICATIONS

This application claims the benefit under 35 U.S.C. Section 119(e) of co-pending and commonly-assigned U.S. provisional patent application, Ser. No. 60/970,307, filed Sep. 6, 2007, entitled "WEIGHTED DILUTION OF PRECISION CALCULATION FOR GPS FIX QUALIFICATION," by Florean Curticapean et al., which application is incorporated by reference herein.

BACKGROUND OF THE INVENTION

1. Field of the Invention

The present invention relates generally to Global Positioning System (GPS) receivers, and in particular, to a method and apparatus for a weighted dilution of precision calculation for GPS fix qualification.

2. Description of the Related Art

The use of Satellite Positioning System (SPS) signals, typically realized in GPS receivers, in consumer products has become commonplace. Hand-held devices used for mountaineering, automobile navigation systems, and GPS for use with cellular telephones are just a few examples of consumer products using GPS technology.

GPS-enabled devices, such as cellular telephones, have also been introduced into the consumer marketplace. These devices allow for the use of Location-Based Services (LBS) which are services, advertisements, and other features that are offered based on the location of the user. As such, GPS-enabled devices are used worldwide.

As GPS technology is being combined with these devices, the GPS chips are being placed in widely ranging applications. Initially, GPS chips were designed for surveying applications, and, as such, the chip and system design was engineered to provide highly accurate positioning measurements and data, without regard to power consumption, semiconductor chip footprint, or other conditions. The GPS chip design was optimized to deliver position data, rather than optimized for each environment the chip is being placed into. Further, some of the GPS portions are being made on the same semiconductor chip as other portions of the combined devices, which subject the GPS portions of these electronic devices to widely-varying semiconductor processing steps.

Since the GPS chips are now being placed into devices that are far afield from the initial intended use for GPS, it can be seen, then, that there is a need in the art to alter the design of a GPS chip to match the requirements of the intended end-user device and environment.

SUMMARY OF THE INVENTION

To minimize the limitations in the prior art, and to minimize other limitations that will become apparent upon reading and understanding the present specification, the present invention discloses a method and apparatus for qualifying a Satellite Positioning System (SPS) location determination. A method in accordance with the present invention comprises determining a constellation of satellites used in the location determination, making a measurement set based on signals received from the constellation of satellites, comparing the measurement set and the constellation of satellites used in the location determination to a predetermined threshold, and reporting the location determination only when the threshold is not exceeded.

Such a method further optionally includes the threshold being user-selectable, the threshold being adjusted or disabled based on a pre-defined scheme, the threshold being adjusted in a sequential form based on a pre-defined scheme, the measurement set being made in a Global Positioning System (GPS) receiver, and the measurement set comprising a weighted geometric dilution of precision, a weighted position dilution of precision, a weighted horizontal dilution of precision, a weighted vertical dilution of precision, and/or a weighted time dilution of precision.

An apparatus for determining a position of a receiver using a constellation of satellites, each satellite in the constellation of satellites transmitting a respective signal in accordance with one or more embodiments of the present invention comprises a radio frequency section and a baseband section, coupled to the radio frequency section, the baseband section comprising at least a memory and a processor, wherein the memory stores the constellation of satellites, and the processor determines the location of the receiver using a subset of the constellation of satellites, the location being determined based on a measurement set derived from signals received from the subset of the constellation of satellites, wherein the location is reported only when the measurement set and the subset of the constellation of satellites meet a predetermined condition.

Such an apparatus further may optionally comprise the condition being user-selectable, the condition being adjusted based on a pre-defined scheme, the condition being disabled based on a pre-defined scheme, the condition being adjusted in a sequential form based on a pre-defined scheme, and the measurement set comprising a weighted geometric dilution of precision, a weighted position dilution of precision a weighted horizontal dilution of precision, a weighted vertical dilution of precision, and/or a weighted time dilution of precision.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Satellite Positioning System

Figure 1:
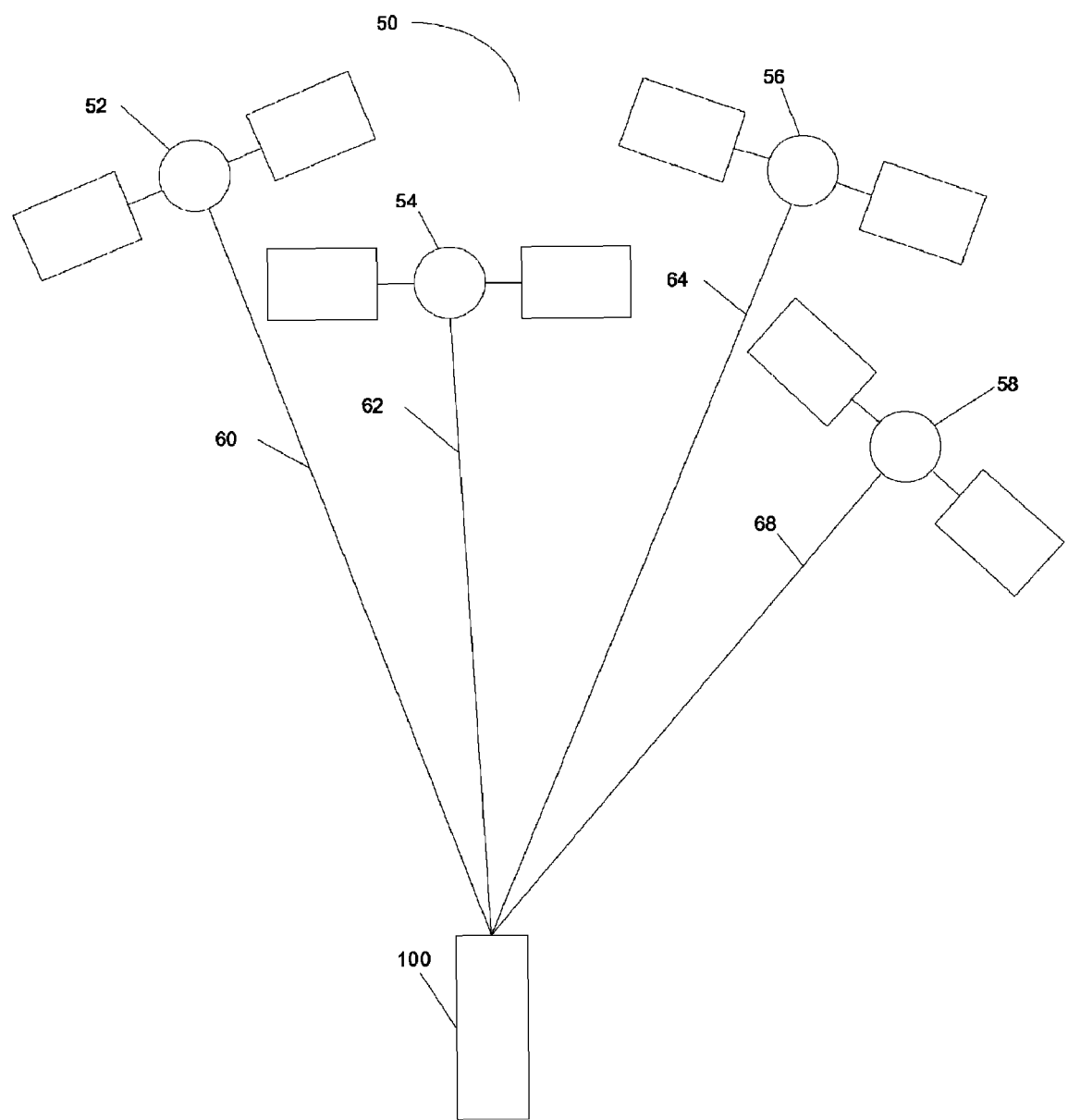
FIG. 1 illustrates a typical Satellite Positioning System.

FIG. 1 illustrates a typical Satellite Positioning System.

System 50 illustrates a constellation of satellites 52-58 and a GPS receiver 100. Each of the satellites 52-58 transmits a signal 60-64 and 68 respectively, which signals 60-64 and 68 are received by receiver 100.

Signals 60-64 and 68 contain information such as time of transmission and system time for system 50. Receiver 100 uses the time it takes for signals 60-64 and 68 to travel the distances between the satellites 52-58 and receiver 100 and the data within signals 60-64 and 68 to determine the x, y, and z coordinates (geoposition) of receiver 100. This generic ranging system is typically known as the Global Positioning System (GPS), which is described in the related art.

The frequencies of interest in a GPS system 50 are in the "L-band" of frequencies, typically around 1575 MHz, but other positioning systems with other frequencies of interest can also benefit from the present invention.

The GPS system typically determines position by calculating the distance, or range, from the receiver to several satellites, and then solving simultaneous equations such that all of the range determinations are true at a given time. This triangulation gives a single solution, and position is determined thereby. Although described with respect to GPS systems, any positioning system can be used with respect to the present invention.

GPS Receiver Overview

Figure 2:
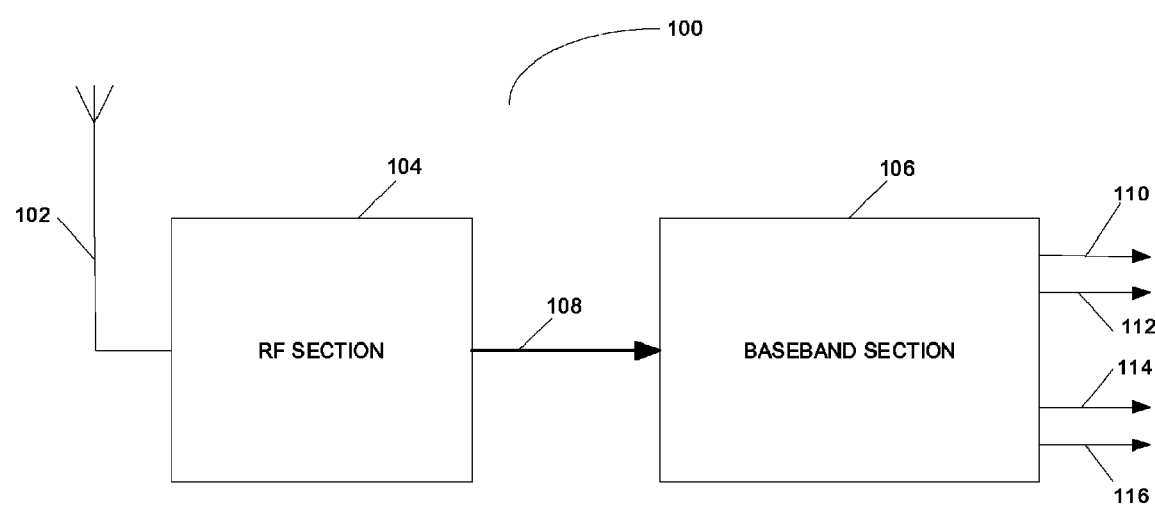
FIG. 2 illustrates a top-level block diagram of a GPS receiver.

FIG. 2 illustrates a top-level block diagram of a GPS receiver.

Receiver 100 typically comprises an antenna 102, a Radio Frequency (RF) section 104, and a baseband section 106. Typically, antenna 102 receives signals that have been transmitted by one or more GPS satellites, that are then amplified and downconverted in the RF section 104. RF section 104 then sends signals 108 to baseband section 106 for processing and position determination. Signals 108 typically include an oscillator signal, an in-phase signal, a quadrature-phase signal an Automatic Gain Control (AGC) signal, and other signals.

Baseband section 106 generates multiple outputs 110-116, e.g., Doppler, pre-processed Intermediate Frequency (IF) data, integrated phase, pseudorange, time, velocity, position, etc.

Figure 3:
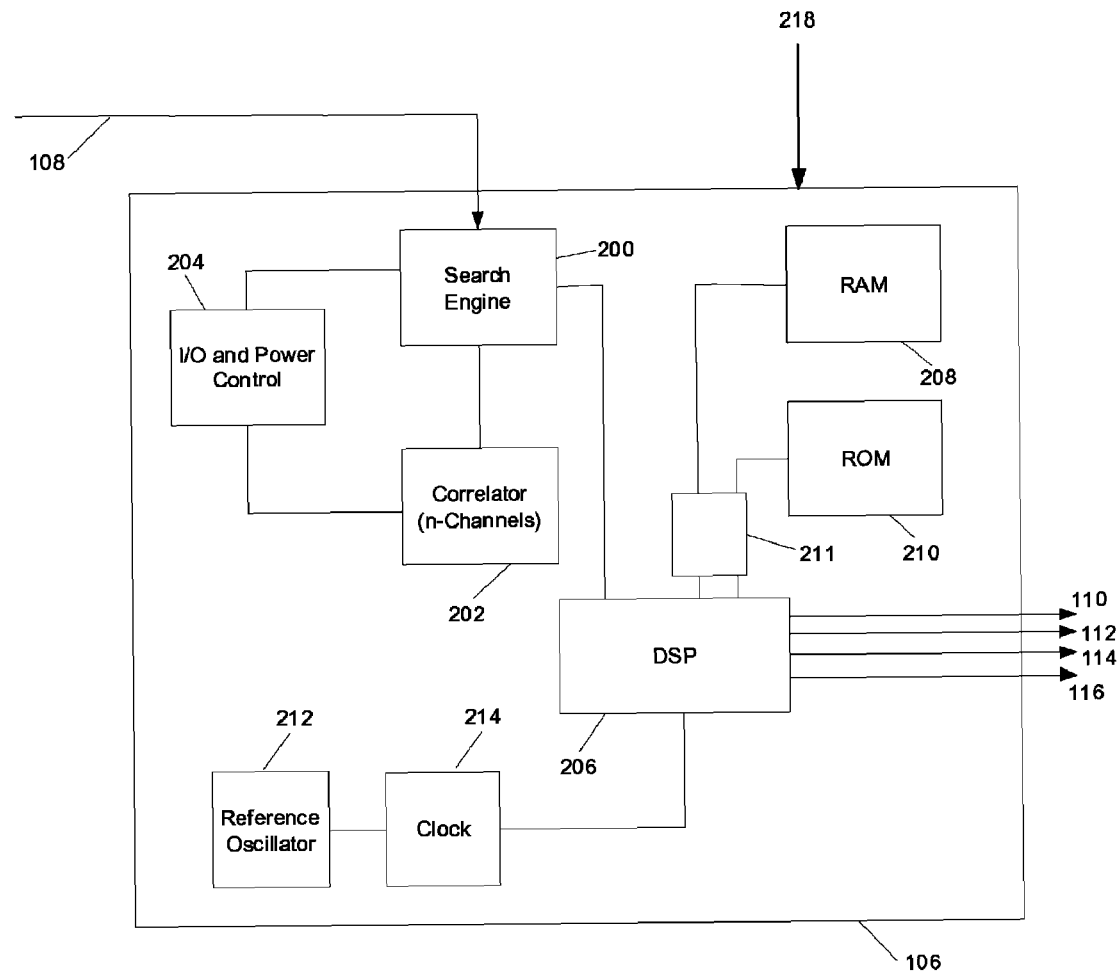
FIG. 3 illustrates a diagram of the baseband section of a GPS receiver.

FIG. 3 illustrates a diagram of the baseband section 106 of a GPS receiver. Baseband section 106 receives signals 108 from the RF section 104, and uses search engine 200 and correlator 202 to process the signals 108 to obtain useful data. Input/Output (I/O) control 204 is coupled to search engine 200 and correlator 202 to manage the power and data flow for search engine 200 and correlator 202. The baseband section 106 may have a battery supply 218.

DSP 206 accesses RAM 208 and ROM 210 for various programming steps that are used to process the data discovered by search engine 200 and correlator 202. DSP then generates the output signals 110-116.

A typical GPS receiver 100 can navigate (track satellites for a given amount of time) and generate position for a given period of time, e.g., for a minute or two, and therefore the receiver 100 must store a lot of data in the RAM 208 and ROM 210. However, a GPS receiver may need less RAM 208 and ROM 210 if tracking and navigation functions are severely limited or not needed at all. For example, an optimized GPS receiver may have a primary function to calculate and report accurate time, and therefore navigation is not required.

The search engine 200, correlator 202, and DSP 206 may be optimized to find one or more GPS satellites and process the signals from the satellites. To properly synchronize the signals, etc. that are being processed, the DSP 206 (and, possibly, the correlators 202, search engine 200, etc), are connected to a reference oscillator 212 and/or clock 214. The reference oscillator 212 is typically a crystal, a Temperature Controlled Crystal Oscillator (TCXO), or other stable oscillating source, which is then either upconverted or downconverted by the clock 214 to generate frequencies of interest. These oscillators can also be used with the RF section 104 if desired.

Position Solution

Figure 4:
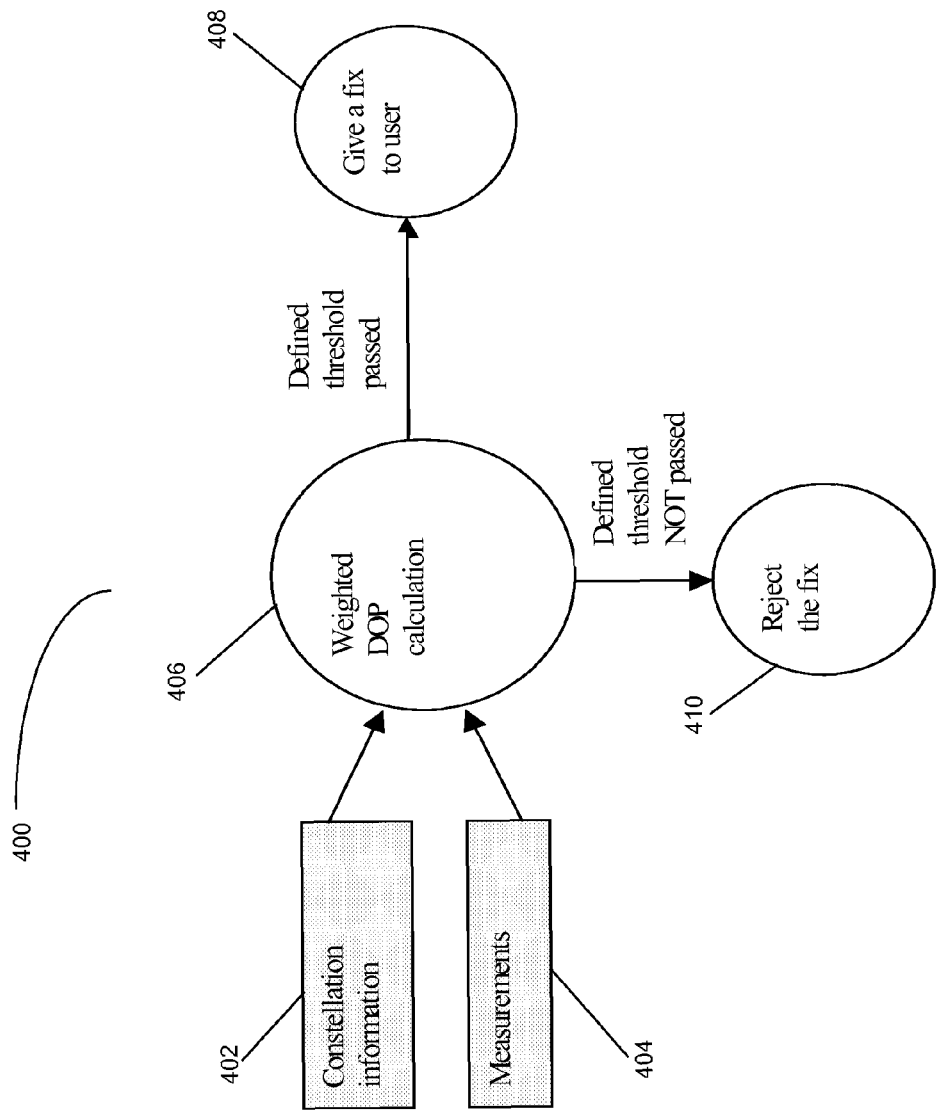
FIG. 4 illustrates a flow diagram in accordance with one or more embodiments of the present invention.

FIG. 4 illustrates a flow diagram in accordance with one or more embodiments of the present invention.

Diagram 400 shows constellation information 402 and measurements 404 being input to a weighted Dilution Of Precision (DOP) calculation 406. Typically, DOP calculations are made by processing the satellite information using DSP 206 as described with respect to FIGS. 1-3, and the GPS receiver 100 typically has knowledge, through ROM 210, of the constellations of satellites and when specific satellites are in view at a given time. The constellation of satellites typically has six different orbital planes with four satellites in each plane. The orbital planes are centered on the Earth, and have approximately a 55° tilt relative to the Earth's equator (also known as inclination). The orbits are arranged so that at least six satellites are always within line of sight from almost everywhere on the Earth's surface, and, as such, receivers have an approximation of which satellites will be in view at any given time, and thus can search for those satellites in the constellation that are more likely to be in view prior to searching for those satellites that are not likely to be in view.

If the constellation information 402 and the measurements 404 exceed a certain threshold of the DOP calculation 406, then the position fix made by DSP 206 is rejected by the receiver 100 as shown in bubble 410. If the constellation information 402 and measurements 404 do not exceed the threshold of the DOP calculation 406, then the position fix is reported to the user in bubble 408.

Determination of Fix Quality

As such, the present invention includes a new method used to qualify a GPS fix. The quality of the Position-Velocity-Time (PVT) solution from a Weighted Least Squares (WLSQ) navigation algorithm is dependent on measurement 404 quality and satellite constellation 406. Even a good measurement set 404 can cause large errors to given PVT information if the satellite constellation 402 is poor. Further, one measurement set 404 which is incorrectly classified to be good can destroy the quality of the position solution reported to the user in bubble 408.

The proposed method calculates a quality estimate within the weighted DOP calculation 406 which combines both constellation information 402 and quality of measurement set 404 to improve position fixes given to user in bubble 408. The present method is especially useful when the user is relying on additional information, such as aiding information, such as when an automotive receiver 100 exits a tunnel or re-enters GPS constellation line-of-sight from an urban canyon or other areas where GPS signal strength is weak.

The present invention calculates a quality estimate by combining both measurements set 404 quality and satellite constellation 402 knowledge in a single calculation flow which simplifies implementation and reduces implementation costs. Tests of the present invention have shown that the method of the present invention has a great positive impact to position accuracy on tunnel exits.

This method calculates a quality estimate for a fix based on the diagonal elements of the matrix D. D is the covariance matrix of the solution X $$D = \text{cov}(X) = E(XX^T) \tag{1}$$

D is defined as follows:

$$D = M^T = (H^T W H)^{-1} = \begin{bmatrix} d_{xx} & d_{xy} & d_{xz} & d_{xt} \\ d_{yx} & d_{yy} & d_{yz} & d_{yt} \\ d_{zx} & d_{zy} & d_{zz} & d_{zt} \\ d_{tx} & d_{ty} & d_{tz} & d_{tt} \end{bmatrix} \quad [2]$$

where H is the measurement matrix, W is the weight matrix, and $d_{12}$ are the determined solutions for x, y, z, and t. The weight matrix $W = \Sigma^{-1}$ is the inverse of the covariance matrix of the observation, $\Sigma = \text{cov}(Y)$.

From the D matrix several quality estimates can be calculated:

The weighted Geometric DOP:

$$\text{WGDOP} = \sqrt{d_{xx} + d_{yy} + d_{zz} + d_{tt}} \quad [3]$$

The weighted Position DOP:

$$\text{WPDOP} = \sqrt{d_{xx} + d_{yy} + d_{zz}} \quad [4]$$

The weighted Horizontal DOP:

$$\text{WHDOP} = \sqrt{d_{xx} + d_{yy}} \quad [5]$$

The weighted Vertical DOP:

$$\text{WVDOP} = \sqrt{d_{zz}} \quad [6]$$

The weighted Time DOP:

$$\text{WTDOP} = \sqrt{d_{tt}} \quad [7]$$

Estimates above may be expressed in an earth centered earth fixed (ECEF) coordinate system. With the topocentric local coordinate system (North, East, Up), the weighted Horizontal DOP (WHDOP) and the weighted Vertical DOP (WVDOP) may also be calculated.

The calculated weighted DOP value(s) are compared to a threshold. Currently the WPDOP is compared with a threshold. If the user is interested only in the horizontal position accuracy then only the Weighted Horizontal DOP (WHDOP) can be used. The threshold is a distance for WGDOP, WPDOP and WVDOP and time for WTDOP. The threshold is selectable based on the maximum error which can be tolerated by the user. So, for example, the WPDOP measurement 404 for a given constellation 402 is compared to the threshold value for WPDOP. If the calculated value is below the threshold, this particular position fix is classified to be valid by the weighted DOP calculation engine 406 and passed on to the user in bubble 408.

The method of the present invention also enables a user-configurable threshold for a single fix validation. So, for example, the user can turn off the system 400 when any position calculation will do, such as emergency situations. Further, emergency situations, such as dialing an E911 number or depressing a panic button on a GPS locator beacon, can automatically disable the method of the present invention or provide a larger or smaller threshold value to allow a larger or smaller number of position determinations to be reported to the user.

The method can also be used with a time-out counter that adjusts or disables the quality checks for sequential fixes based on a pre-defined scheme. So, for example, if the receiver 100 has gone for more than a minute without reporting a fix to the user in bubble 408, the weighted DOP calculation engine 406 thresholds are adjusted or eliminated to allow a fix to be reported. The calculation takes part in the DSP block 206.

CONCLUSION

In summary, the present invention describes a method and apparatus for qualifying a Satellite Positioning System (SPS) location determination. A method in accordance with the present invention comprises determining a constellation of satellites used in the location determination, making a measurement set based on signals received from the constellation of satellites, comparing the measurement set and the constellation of satellites used in the location determination to a predetermined threshold, and reporting the location determination only when the threshold is not exceeded.

Such a method further optionally includes the threshold being user-selectable, the threshold being adjusted or disabled based on a pre-defined scheme, the threshold being adjusted in a sequential form based on a pre-defined scheme, the measurement set being made in a Global Positioning System (GPS) receiver, and the measurement set comprising a weighted geometric dilution of precision, a weighted position dilution of precision a weighted horizontal dilution of precision, a weighted vertical dilution of precision, and/or a weighted time dilution of precision.

An apparatus for determining a position of a receiver using a constellation of satellites, each satellite in the constellation of satellites transmitting a respective signal in accordance with one or more embodiments of the present invention comprises a radio frequency section and a baseband section, coupled to the radio frequency section, the baseband section comprising at least a memory and a processor, wherein the memory stores the constellation of satellites, and the processor determines the location of the receiver using a subset of the constellation of satellites, the location being determined based on a measurement set derived from signals received from the subset of the constellation of satellites, wherein the location is reported only when the measurement set and the subset of the constellation of satellites meet a predetermined condition.

Such an apparatus further may optionally comprise the condition being user-selectable, the condition being adjusted based on a pre-defined scheme, the condition being disabled based on a pre-defined scheme, the condition being adjusted in a sequential form based on a pre-defined scheme, and the measurement set comprising a weighted geometric dilution of precision, a weighted position dilution of precision a weighted horizontal dilution of precision, a weighted vertical dilution of precision, and/or a weighted time dilution of precision.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto and the full range of equivalents to the claims thereof.

What is claimed is:

1. A method for qualifying a Satellite Positioning System (GPS) location determination, comprising:
   determining a constellation of satellites used in the location determination;
   making a measurement set based on signals received from the constellation of satellites;
   comparing the measurement set and the constellation of satellites used in the location determination to a predetermined threshold, wherein the threshold is user-selectable from a plurality of thresholds; and reporting the location determination only when the threshold is not exceeded.

2. The method of claim 1, wherein the threshold is adjusted based on a pre-defined scheme.

3. The method of claim 1, wherein the threshold is disabled based on a predefined scheme.

4. The method of claim 1, wherein the threshold is adjusted in a sequential form based on a pre-defined scheme.

5. The method of claim 1, wherein the measurement set is made in a Global Positioning System (GPS) receiver.

6. The method of claim 1, wherein the measurement set comprises a weighted geometric dilution of precision.

7. The method of claim 1, wherein the measurement set comprises a weighted position dilution of precision.

8. The method of claim 1, wherein the measurement set comprises a weighted horizontal dilution of precision.

9. The method of claim 1, wherein the measurement set comprises a weighted vertical dilution of precision.

10. An apparatus for determining a position of a receiver using a constellation of satellites, each satellite in the constellation of satellites transmitting a respective signal, comprising:
  a radio frequency section; and
  a baseband section, coupled to the radio frequency section, the baseband section comprising at least a memory and a processor, wherein the memory stores the constellation of satellites, and the processor determines the location of the receiver using a subset of the constellation of satellites, the location being determined based on a measurement set derived from signals received from the subset of the constellation of satellites, wherein the location is reported only when the measurement set and the subset of the constellation of satellites meet a predetermined condition, wherein the condition is user-selectable from a plurality of conditions.

11. The apparatus of claim 10, wherein the condition is adjusted based on a pre-defined scheme.

12. The apparatus of claim 10, wherein the condition is disabled based on a pre-defined scheme.

13. The apparatus of claim 10, wherein the condition is adjusted in a sequential form based on a pre-defined scheme.

14. The apparatus of claim 10, wherein the measurement set comprises a weighted geometric dilution of precision.

15. The apparatus of claim 10, wherein the measurement set comprises a weighted position dilution of precision.

16. The apparatus of claim 10, wherein the measurement set comprises a weighted horizontal dilution of precision.

17. The apparatus of claim 10, wherein the measurement set comprises a weighted vertical dilution of precision.

18. The apparatus of claim 10, wherein the measurement set comprises a weighted time dilution of precision.

\* \* \* \* \*